US007698733B2

(12) United States Patent
Kutaragi et al.

(10) Patent No.: US 7,698,733 B2
(45) Date of Patent: Apr. 13, 2010

(54) COMPUTER SYSTEM AND USAGE METHOD THEREOF

(75) Inventors: Ken Kutaragi, Kanagawa (JP); Shinichi Okamoto, Tokyo (JP); Kazuo Miura, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 1183 days.

(21) Appl. No.: 10/066,457

(22) Filed: Jan. 31, 2002

(65) Prior Publication Data

US 2002/0129262 A1    Sep. 12, 2002

(30) Foreign Application Priority Data

Jan. 31, 2001  (JP)  ............................. 2001-022811
Jan. 30, 2002  (JP)  ............................. 2002-022360

(51) Int. Cl.
  *G06F 7/04*    (2006.01)
(52) U.S. Cl. ............................... 726/5; 726/3; 382/115; 713/186; 709/229
(58) Field of Classification Search ................. 709/203, 709/229; 705/54, 57, 8; 726/5, 3; 382/115; 713/186

See application file for complete search history.

(56) References Cited

U.S. PATENT DOCUMENTS

| 5,023,907 | A |   | 6/1991  | Johnson et al.        |         |
|-----------|---|---|---------|-----------------------|---------|
| 5,406,546 | A | * | 4/1995  | Uchiyama et al.       | 369/275.4 |
| 5,490,216 | A |   | 2/1996  | Richardson, III       |         |
| 5,761,301 | A | * | 6/1998  | Oshima et al.         | 705/57  |
| 5,857,021 | A | * | 1/1999  | Kataoka et al.        | 705/54  |
| 5,982,887 | A | * | 11/1999 | Hirotani              | 705/51  |
| 5,991,881 | A | * | 11/1999 | Conklin et al.        | 726/22  |
| 6,044,471 | A | * | 3/2000  | Colvin                | 726/28  |

(Continued)

FOREIGN PATENT DOCUMENTS

CN    1154512 A    7/1997

(Continued)

OTHER PUBLICATIONS

Mary Foley, *Microsoft and Piracy: Try, Try Again*, ZDNet News, Jan. 11, 2001, http://zdnet.com.

(Continued)

*Primary Examiner*—Kambiz Zand
*Assistant Examiner*—Roderick Tolentino
(74) *Attorney, Agent, or Firm*—Lerner, David, Littenberg, Krumholz & Mentlik, LLP (57) ABSTRACT

A computer system having a verification system for verifying whether or not disks are being used in an unauthorized manner comprises a plurality of computers each capable of being loaded with a disk storing application programs, and an authentication server capable of being connected with the computers via a network, wherein each computer has a unique device ID, each disk has a unique disk ID, and the server has a user database for accumulating the device ID when using the computer and the disk ID when using the disk, such that data is accumulated in the user database in pairs of disk ID and device ID. In the event of using the disk for the second time or subsequent times, data for the disk ID and data for the device ID are transmitted from the computer to the host server, thereby verifying at the host server that the usage is valid.

14 Claims, 7 Drawing Sheets

CONCEPTUAL DIAGRAM OF SYSTEM

U.S. PATENT DOCUMENTS

| | | | |
|---|---|---|---|
| 6,073,109 A * | 6/2000 | Flores et al. | 705/8 |
| 6,243,468 B1 * | 6/2001 | Pearce et al. | 380/255 |
| 6,345,256 B1 * | 2/2002 | Milsted et al. | 705/1 |
| 6,578,149 B1 * | 6/2003 | Kawamae et al. | 726/26 |
| 6,654,888 B1 * | 11/2003 | Cooper et al. | 713/190 |
| 6,738,950 B1 * | 5/2004 | Barnett | 715/205 |
| 6,901,511 B1 * | 5/2005 | Otsuka | 713/164 |
| 6,948,168 B1 * | 9/2005 | Kuprionas | 717/178 |
| 7,178,169 B1 * | 2/2007 | Salmonsen et al. | 726/31 |

FOREIGN PATENT DOCUMENTS

| | | |
|---|---|---|
| EP | 1 048 998 A2 | 11/2000 |
| EP | 1 071 253 A1 | 1/2001 |
| JP | 02-029823 A1 | 1/1990 |
| JP | 5-073293 A | 3/1993 |
| JP | 07-182766 A1 | 7/1995 |
| JP | 8-101799 A | 4/1996 |
| JP | 8-185444 A | 7/1996 |
| JP | 09-115241 A1 | 5/1997 |
| JP | 9-134330 A | 5/1997 |
| JP | 09-171619 A1 | 6/1997 |
| JP | 09-306097 A1 | 11/1997 |
| JP | 10-116189 | 5/1998 |
| JP | 10-208388 A1 | 8/1998 |
| JP | 11-328293 A | 11/1999 |
| JP | 11-355266 A1 | 12/1999 |
| JP | 2000-200195 A | 7/2000 |
| JP | 2000-207199 A | 7/2000 |
| JP | 2000-222363 A | 8/2000 |
| JP | 2000-307650 A | 11/2000 |
| JP | 2000-311083 A | 11/2000 |
| JP | 2000-339273 A | 12/2000 |
| WO | WO-95/35533 A1 | 12/1995 |
| WO | WO-98/12891 | 3/1998 |
| WO | WO-98/42098 A1 | 9/1998 |

OTHER PUBLICATIONS

Mary Foley, *New 'Whistler' Build Adds Anti-piracy Lock*, ZDNet News, Jan. 7, 2001, http://zdnet.com.

* cited by examiner

FIG. 1

CONCEPTUAL DIAGRAM OF SYSTEM

FIG. 2

CONFIGURATION OF ENTERTAINMENT APPARATUS MAIN UNIT

DISK ID VERIFICATION (PROCESSING AT APPARATUS MAIN UNIT)

| No. | TRANSMITTED INFORMATION | STORED DISK ID | STORED DEVICE ID |
|---|---|---|---|
| 1 | TRANSMITTED DISK ID, AND TRANSMITTED DEVICE ID | ○ | ○ |
| 2 | | ○ | × |
| 3 | | × | ○ |
| 4 | | × | × |

FIG. 7

COMPUTER SYSTEM AND USAGE METHOD THEREOF

BACKGROUND OF THE INVENTION

The present invention relates to a verification system for verifying whether or not recording media such as optical disks, are being used in an unauthorized manner.

Computers that are loaded with and use optical disks can execute various types of programs. One type of such computers is an entertainment system, use of which is represented by use as game apparatuses. With such an entertainment system, the user purchases an optical disk storing game programs, and executes the game. Also, recently, there is being planned an arrangement wherein entertainment systems are connected via a network with content servers storing a great number of game programs, so users can download and purchase game programs via the network.

There may be cases wherein a purchased optical disk or an optical disk storing downloaded programs is used in an unauthorized manner. That is to say, there may be cases wherein optical disks storing downloaded programs are copied in an unauthorized manner, or resold as secondhand items without permission of the copyright holder of the program. If this situation is left unremedied, copyright holders cannot collect their just profits, leading to lessened motivation for creating programs.

SUMMARY OF THE INVENTION

The present invention has been made in light of such problems, and accordingly, it is an object thereof to provide a computer system having a verification system for verifying whether or not optical disks are being used in an unauthorized manner.

Another object of the present invention is to provide a method for using a computer system having a verification system for verifying whether or not optical disks are being used in an unauthorized manner.

To this end, in one aspect of the present invention, there is provided a network system comprising: a first information processing apparatus (e.g. an entertainment apparatus) capable of being loaded with a first recording medium (e.g. an optical disk); and a second information processing apparatus (e.g. an authentication server) capable of being connected to the first information processing apparatus via a network, wherein the second information processing apparatus is operative to receive, from the first information processing apparatus, unique information (e.g. an apparatus ID) relating to the first information processing apparatus and unique information (e.g. a disk ID) relating to the first recording medium, and further the second information processing apparatus is operative to make reference to each of said received unique information and also to information within a database which is included in, or connected to, the second information processing apparatus and capable of accumulating, erasing and so on of information, to perform verification of the recording medium.

The second information processing apparatus may further enable the database to accumulate either of the unique information relating to the first information processing apparatus or the unique information relating to the first recording medium.

The second information processing apparatus may further enable the database to accumulate both of the unique information relating to the first information processing apparatus and the unique information relating to the first recording medium.

The information within the database may comprise either of the unique information relating to the first information processing apparatus or the unique information relating to the first recording medium, which is pre-recorded in the database.

The information within the database may comprise both of the unique information relating to the first information processing apparatus and the unique information relating to the first recording medium, which are pre-recorded in the database.

The information within the database may be updated to newly accumulated information.

Whenever unauthorized usage of the recording medium occurs, either of the unique information relating to the first information processing apparatus or the unique information relating to the first recording medium may be accumulated in the database.

The second information processing apparatus may further enable or disable processing to be performed in the first information processing apparatus.

The second information processing apparatus may further enable or disable the first information processing apparatus to read out a program stored in the first recording medium.

The second information processing apparatus may be operative to transmit a permission signal for enabling processing to be performed by the first information processing apparatus or an inhibit signal for disabling processing to be performed by the first information processing apparatus.

If the results of the reference made by the second information processing apparatus indicates that information corresponding to the unique information relating to the first recording medium is accumulated in the database, then the processing to be performed by the first information processing apparatus may be enabled.

The unique information relating to the first information processing apparatus and the unique information relating to the first recording medium may be accumulated as interrelated information in the database, wherein if the results of the reference made by the second information processing apparatus indicates that the unique information relating to the first information processing apparatus and the unique information relating to the first recording medium, received by the second information processing apparatus, match with the interrelated information in the database, then the processing to be performed by the first information processing apparatus may be enabled.

An encrypted program may be stored in the first recording medium, wherein the second information processing apparatus may be operative to transmit information for decrypting the program in the first recording medium that is encrypted by the first information processing apparatus, thereby to enable reading of the first recording medium by the first information processing apparatus.

The information for decrypting may comprise a decryption key.

In one embodiment of the invention, the network system further includes a third information processing apparatus capable of being loaded with a second recording medium (e.g. an optical disk) different from the first recording medium, wherein the second information processing apparatus may be operative to receive unique information relating to the second recording medium from the third information processing apparatus, after receipt of the unique information relating to the first recording medium from the first information processing apparatus.

The second information processing apparatus may be operative to make reference to the unique information relating to the first recording medium received from the first information processing apparatus and the unique information relating to the second recording medium received from the third information processing apparatus, and further if the same unique information as made reference to by the second information processing apparatus occur simultaneously, the second information processing apparatus may enable or disable the third information processing apparatus (e.g. other entertainment apparatus) to read out a program stored in the second recording medium.

The second information processing apparatus may be operative to transmit, to the first information processing apparatus, information for confirmation of whether execution processing of the second recording medium to be performed in the third information processing apparatus is allowed or not.

The second information processing apparatus may be operative to allow the third information processing apparatus to perform the execution processing of the second recording medium, when it has received execution allowance information from the first information processing apparatus responding to the confirmation information.

In one embodiment of the present network system, the first information processing apparatus is further capable of being loaded with a third recording medium (e.g. memory card), wherein the second information processing apparatus may be operative to transmit the unique information relating to the first information processing apparatus and the unique information relating to the first recording medium to the first information processing apparatus after it has received each of said unique information from the first information processing apparatus, and then the first information processing apparatus may enable the second recording medium to store each of said unique information.

The first information processing apparatus may make reference to the unique information relating to the first recording medium as well as information stored in the second recording medium.

If the results of the reference made by the first information processing apparatus indicates that information corresponding to the unique information relating to the first recording medium is stored in the second recording medium, then the processing to be performed by the first information processing apparatus may be enabled.

In accordance with another aspect of the present invention, there is provided a network system comprising: a first information processing apparatus capable of being loaded with a first recording medium; a second information processing apparatus capable of being loaded with a first recording medium; and a third information processing apparatus capable of being connected to the first and second information processing apparatus via a network; wherein the third information processing apparatus is operative to receive, from the first and second information processing apparatus, unique information relating to the first recording medium and unique information relating to the second recording medium, respectively, and further the third information processing apparatus is operative to make reference to the unique information relating to the first recording medium and the unique information relating to the second recording medium, and then if the same unique information as made reference to by the third information processing apparatus occur simultaneously, the third information processing apparatus may enable or disable the second information processing apparatus to read out a program stored in the second recording medium.

In one embodiment of the present network system, unique information relating to respective information processing apparatus is an apparatus ID.

In one embodiment of the present network system, unique information relating to respective information processing apparatus is a user ID.

In one embodiment of the present network system, the unique information relating to respective recording medium is a disk ID.

In one embodiment of the present network system, the recording medium storing the application programs is an optical disk, and the unique information relating to said recording medium is a disk ID.

The disk ID may be recorded in a region within a data area or a region other than the data area of the optical disk.

The disk ID may be detected by a computer based on an address of disk ID data recorded in a data area of the optical disk.

The disk ID may be recorded in the disk with an organic coloring matter.

The disk ID may be formed with a method using physical changes in pit rows.

The method using physical changes in pit rows may use one of a change in radical direction of pit rows, a change in the minor axis direction of pit size, and a change in the depth direction of pits.

The disk ID may be formed with a method using electronic watermarking.

In accordance with a further aspect of the present invention, there is provided a method of performing verification of a recording medium by utilizing a network system, wherein said system comprises a first information processing apparatus capable of being loaded with a first recording medium, and a second information processing apparatus capable of being connected to the first information processing apparatus via a network, said method comprising the steps of: using the second information processing apparatus to receive, from the first information processing apparatus, unique information relating to the first information processing apparatus and unique information relating to the first recording medium; and using the second information processing apparatus to make reference to each of said received unique information and also to information within a database which is included in, or connected to, the second information processing apparatus and capable of accumulating, erasing and so on of information, whereby verification of the recording medium is performed.

In accordance with another aspect of the present invention, there is provided a first information processing apparatus capable of being mounted with a first recording medium, wherein the first information processing apparatus is capable of being connected to a second information processing apparatus via a network, and further the first information processing apparatus is operative to transmit, to the second information processing apparatus, unique information relating to the first information processing apparatus and unique information relating to the first recording medium, whereby the recording medium is verified by making reference to each of said transmitted information and also to information within a database which is included in, or connected to, the second information processing apparatus and capable of accumulating, erasing and so on of information.

In accordance with another aspect of the present invention, there is provided a second information processing apparatus capable of being connected through a network to a first information processing apparatus capable of being loaded with a first recording medium, wherein the second information processing apparatus is operative to receive, from the first information processing apparatus, unique information relating to the first information processing apparatus and unique information relating to the first recording medium, and then to make reference to each of said received unique information and also to information within a database which is included in, or connected to, the second information processing apparatus and capable of accumulating, erasing and so on of information, to perform verification of the recording medium.

In accordance with another aspect of the present invention, there is provided a recording medium capable of being executed by a second information processing apparatus which is connected through a network to a first information processing apparatus capable of being loaded with a first recording medium, wherein the recording medium stores a program capable of being read and executed by the second information processing apparatus, and wherein the program is capable of causing steps to occur, including receiving, from the first information processing apparatus, unique information relating to the first information processing apparatus and unique information relating to the first recording medium; and making reference to each of said received unique information and also to information within a database which is included in, or connected to, the second information processing apparatus and capable of accumulating, erasing and so on of information, to perform verification of the recording medium.

In accordance with another aspect of the present invention, there is provided a recording medium capable of being executed by a first information processing apparatus which is capable of being loaded with a first recording medium and further capable of being connected to a second information processing apparatus via a network, wherein the recording medium stores a program capable of being read and executed by the first information processing apparatus, and wherein the program causes steps to occur, including: transmitting, to the second information processing apparatus, unique information relating to the first information processing apparatus and unique information relating to the first recording medium; and making reference to each of said transmitted unique information and also to information within a database which is included in, or connected to, the second information processing apparatus and capable of accumulating, erasing and so on of information, to perform verification of the recording medium.

In accordance with another aspect of the present invention, there is provided a program capable of being executed by a second information processing apparatus which is connected through a network to a first information processing apparatus capable of being loaded with a first recording medium, wherein the program is capable of being read and executed by the second information processing apparatus, and wherein the program causes steps to occur, including: receiving, from the first information processing apparatus, unique information relating to the first information processing apparatus and unique information relating to the first recording medium; and making reference to each of said received unique information and also to information within a database which is included in, or connected to, the second information processing apparatus and capable of accumulating, erasing and so on of information, to perform verification of the recording medium.

In accordance with another aspect of the present invention, there is provided a program capable of being executed by a first information processing apparatus which is capable of being loaded with a first recording medium and further capable of being connected to a second information processing apparatus via a network, wherein the program is capable of being read and executed by the first information processing apparatus, and wherein the program causes steps to occur, including: transmitting, to the second information processing apparatus, unique information relating to the first information processing apparatus and unique information relating to the first recording medium; and making reference to each of said transmitted unique information and also to information within a database which is included in, or connected to, the second information processing apparatus and capable of accumulating, erasing and so on of information, to perform verification of the recording medium.

DESCRIPTION OF THE PREFERRED EMBODIMENTS

Embodiments of the present invention will now be described with reference to the attached drawings.

Figure 1:
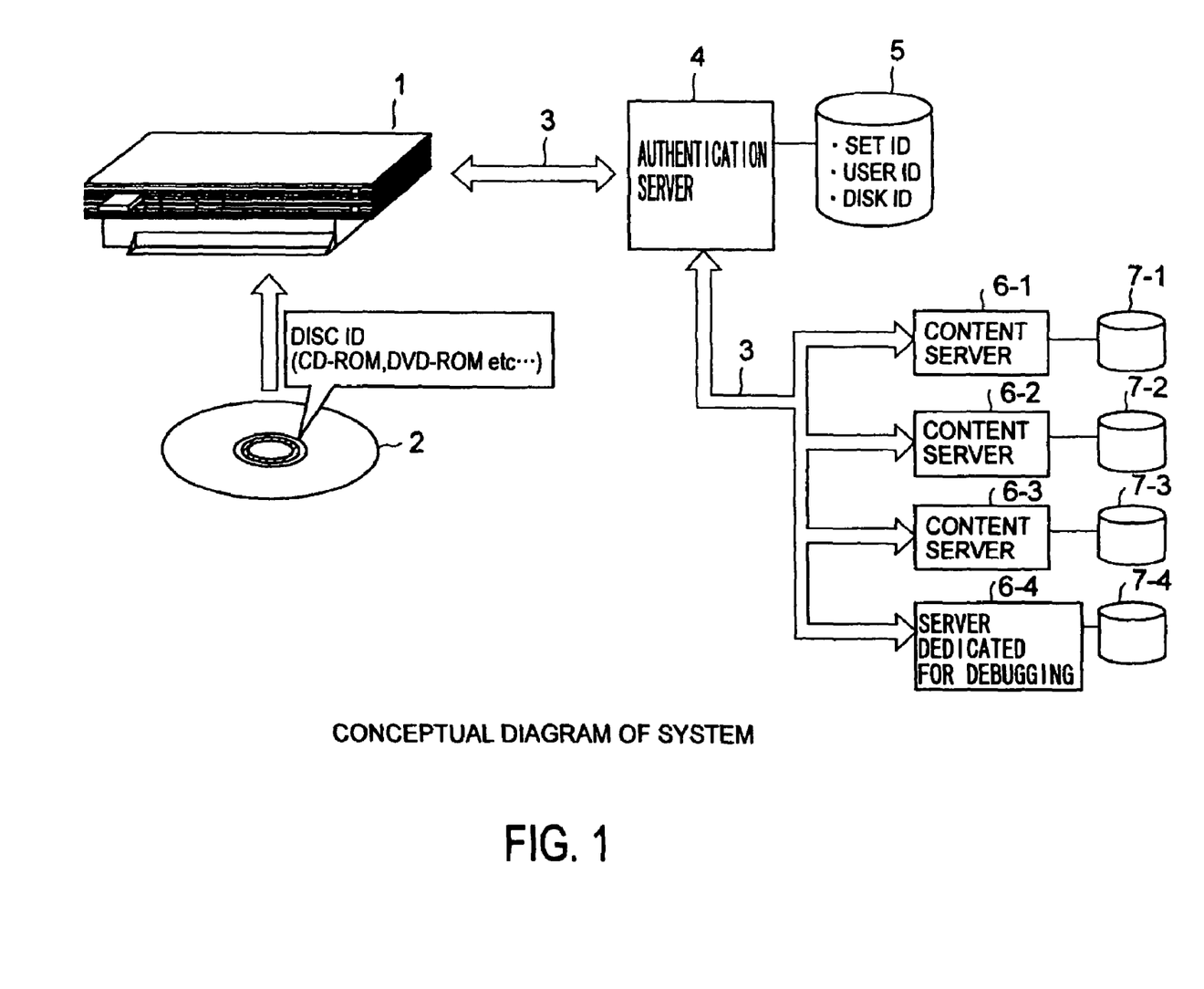
FIG. 1 is a diagram describing a disk ID verification system.

FIG. 1 is a conceptual diagram of the overall disk verification system according to the present embodiment. As shown in FIG. 1, a user terminal device 1 is connected with an authentication server 4 via a network 3. The authentication server 4 is connected to one, two, or more content servers 6 via the network 3. At least one of the content servers 6 may be a dedicated debugging server 6-4.

The user terminal device 1 is a computer capable of being mounted (loaded, or otherwise coupled) with an optical disk 2 storing application programs, such as a CD-ROM (Compact Disk Read-Only Memory), DVD-ROM (Digital Versatile Disk-ROM), or the like. The present embodiment will be described with reference to an entertainment system represented by a game device or the like, as an example of the computer. The user terminal device 1 is the entertainment apparatus main unit 1 here, and the internal configuration of the entertainment apparatus main unit will be described later with reference to FIG. 2. Note that the optical disk 2 is only an example, and the present invention is not restricted to this; rather, all types of recording media storing content, such as application programs, are encompassed therein. For example, in the event that content, such as application programs, are stored in an externally-connected hard disk (not shown), in a memory card connected to a later-described connector, in the memory of a PDA, or the like, these are encompassed as well. However, this description will be made with the example of an optical disk 2 to facilitate explanation.

Preferably used as the network 3 is a so-called broadband network, such as a television cable network, optical fiber network, xDSL (x Digital Subscriber Line), or the like. Also, already-existing or yet-to-be-constructed wide-area wireless networks, telephone-related networks for cellular telephones or PHS (Personal Handiphone System) telephones, Internet-related networks, etc., may be used as well.

The authentication server 4 is a server that is connected to the entertainment apparatus 1 and is used for verifying whether the entertainment apparatus 1 and the recording medium 2 are valid or not valid. The authentication server 4 has a user database 5 for storing unique device ID (also referred to as SET ID) information given to each of the entertainment apparatus main units 1, unique user ID (also referred to as USER ID) information (which may include passwords) given to each of the users, and unique disk IDs given to each of the optical disks 2 and the like. These IDs are each completely unique, and no two IDs are the same. Particularly, the disk ID is a different identification symbol appropriated to each optical disk.

Also, the content servers 6 each have databases storing various types of digital content which can be provided to users.

Further, the entertainment apparatus 1 may be used in place of the authentication server 4. In other words, a particular one of a plurality of interconnected entertainment apparatus may be used to function as an authentication server. In such case, a database 5 to be connected to this particular apparatus may be comprised of a hard disk.

Figure 2:
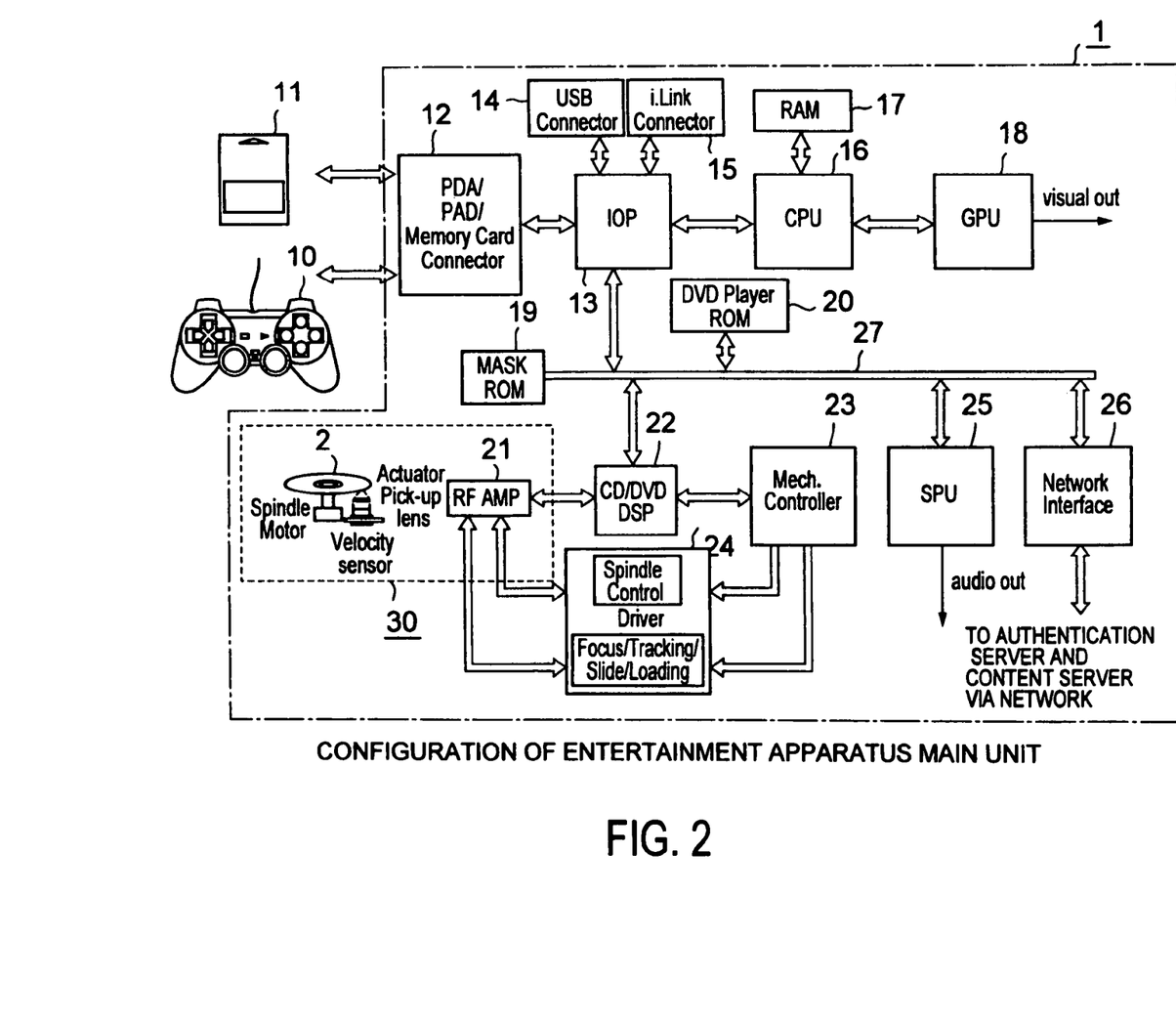
FIG. 2 is a diagram illustrating the configuration of the entertainment apparatus main unit shown in FIG. 1.

FIG. 2 is a block diagram of the internal configuration of an entertainment system apparatus main unit 1 used as the user terminal shown in FIG. 1. In the diagram, within the single-dotted broken line is the entertainment apparatus main unit 1, and within the dotted line is the disk drive unit 30 of the entertainment apparatus main unit 1.

The entertainment apparatus main unit 1 has a CPU 16, and the CPU 16 is connected with a main memory (RAM) 17. The CPU 16 is also connected with a graphics drawing device (GPU) 18, and picture signals from the GPU 18 are output to a display device (CRT) via a CRT-CTR (Cathode Ray Tube Controller) not shown in the drawings. Also, the CPU 16 is connected to a connector (controller (PAD)/PDA (Personal Digital Assistant/memory card connector) 12 via an IOP (Input/Output Processor) 13 having a USB (Universal Serial Bus) connector 14, an IEEE 1394 or i.LINK® connector 15, etc.

Connected to the connector 12 are a memory card 11, a controller (PAD) 10, a portable terminal device (PDA: Personal Digital Assistant), and so forth. The memory card 11 or PDA or the like is a type of external storage device, with disk ID, device ID, etc., stored therein, as described later.

Also, the CPU 16 is connected to a bus 27 via an IOP 13, with a MASK-ROM (Masked ROM) 19, a CD/DVD-DSP (CD/DVD Digital Signal Processor) 22, a DVD player ROM 20, an SPU (Sound Processing Unit) 25, a network interface 26, etc., connected to the bus 27. Audio signals from the SPU 25 are output to an amplifier, speaker, etc., which are not shown. The entertainment apparatus main unit 1 is connected to the network via the network interface 26, USB connector, 14 i.LINK® connector 15, etc., and further is connected to the authentication server 4, digital contents servers 6, etc., via the network.

The CD/DVD-DSP 22 performs mechanical control of the disk drive unit 30, via a mechanical control unit 23 and driver 24. This control is made through an RF-AMP (Radio Frequency Amplifier) 21. Also, the CD/DVD-DSP 22 performs electrical control of the disk drive unit 30 via the RF-AMP 21.

The optical disk 2 is rotated by mechanical control of a spindle motor (not shown). Also, a pick-up lens (not shown) is driven by electrical control of an actuator (not shown) so as to record to and play information from the optical disk 2.

The entertainment apparatus 1 has an apparatus ID as its unique ID (such as manufacture serial number). The apparatus ID may be either installed in a form of hardware, as by embedding into a mask ROM 19 beforehand, or read in later by use of software through an optical disk 2, portable terminal device, controller 10 or the like.

Also, a disk ID is stored in the optical disk 2, and this disk ID is read by a later-described method.

Figure 3:
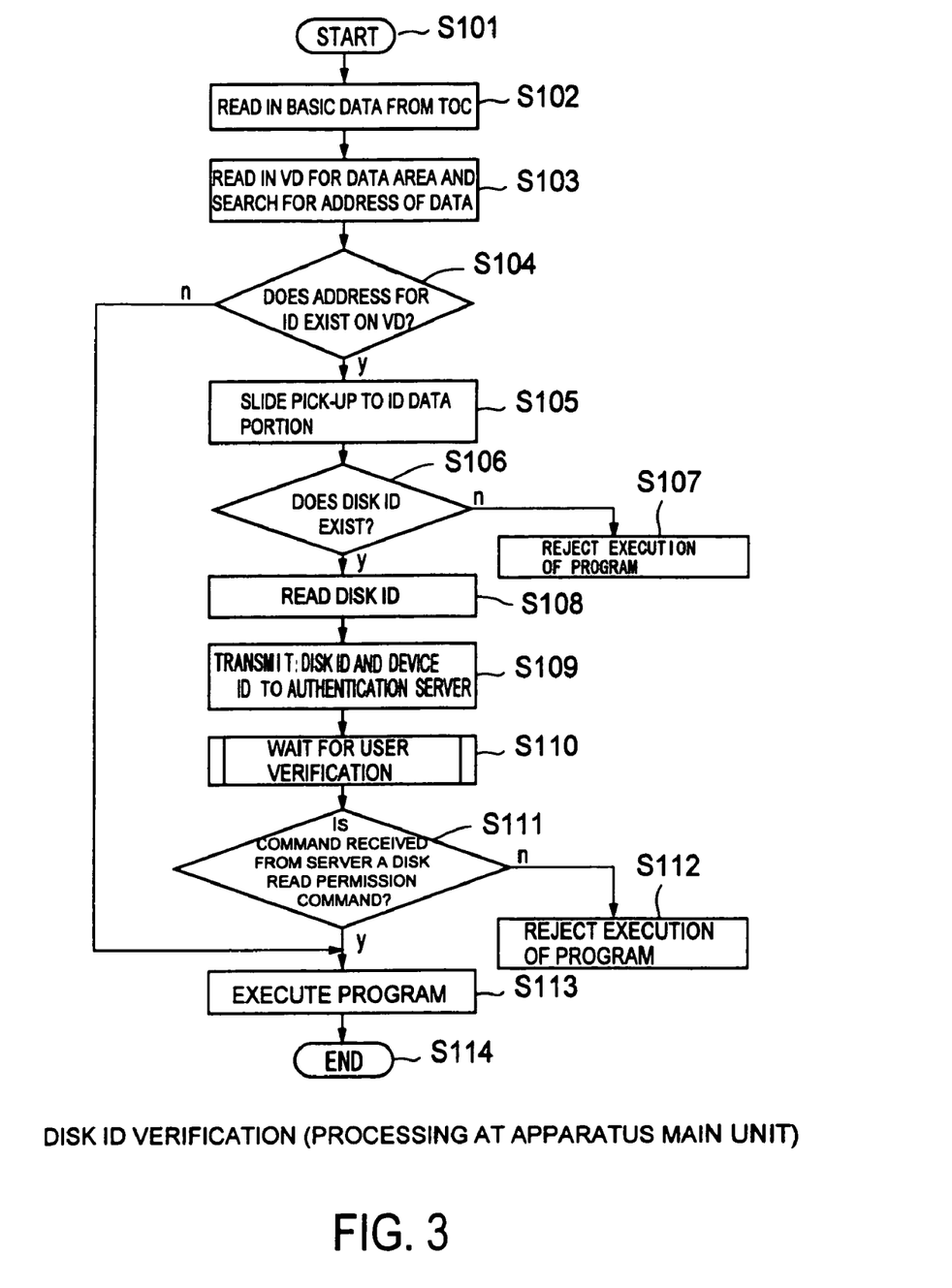
FIG. 3 is a flowchart of the processing at the apparatus main unit side in a first disk ID verification method.
Figure 4:
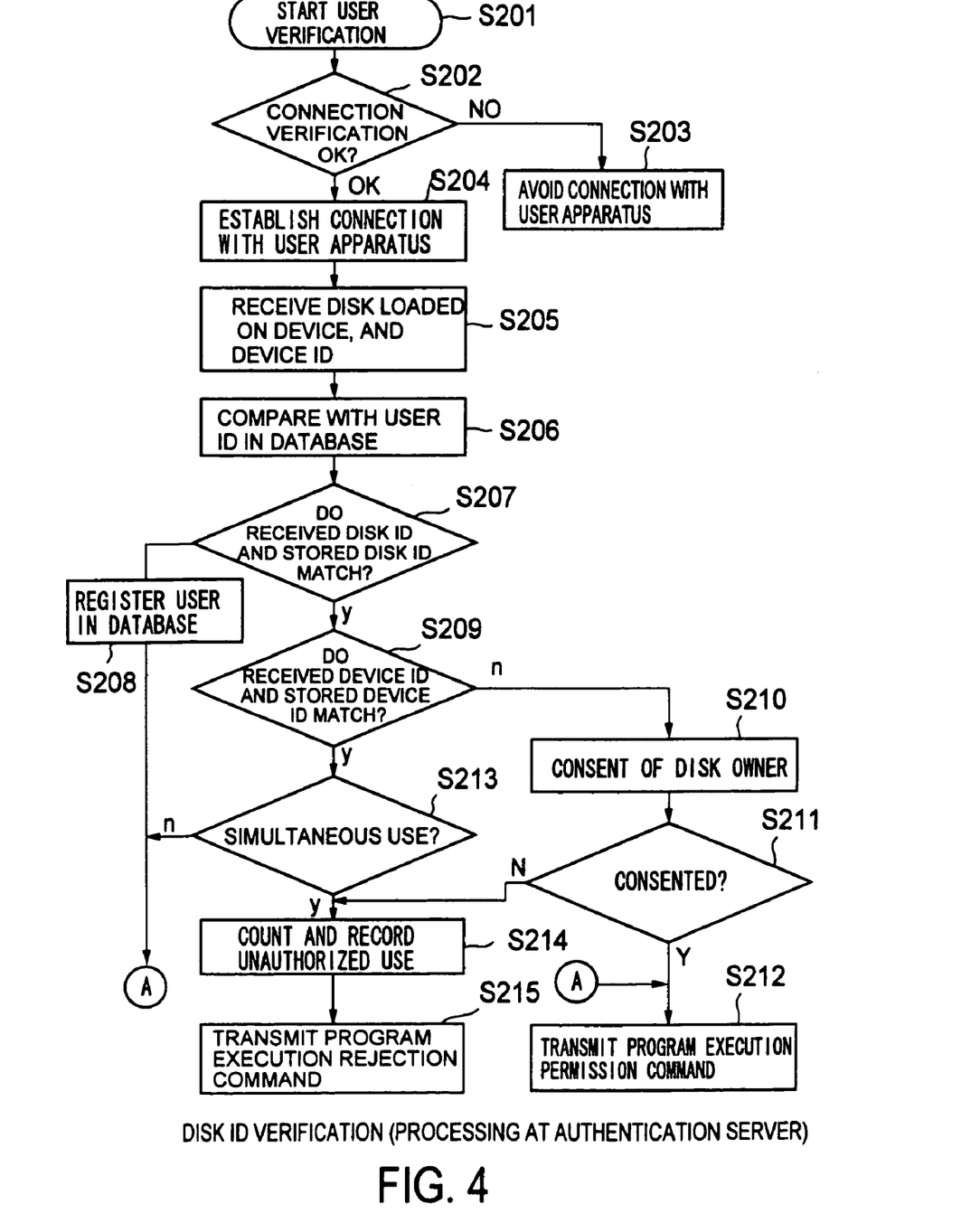
FIG. 4 is a flowchart of the processing at the authentication server side in a first disk ID verification method.

The following is a specific description of the processing at the entertainment apparatus main unit 1 side according to the first disk ID verification system, with reference to FIG. 3, and a specific description of the processing at the authentication server 4 side thereof, with reference to FIG. 4. Note that with the present embodiment, the entertainment system is a game apparatus, using an optical disk (e.g. a CD-ROM) as a recording medium storing game programs, and the disk ID is assumed to exist at an area other than the normal data area (e.g., on the inner side of the read-in area, on the outer side of the read-out area, etc.).

FIG. 3 illustrates the processing at the entertainment apparatus main unit 1 side. The basic processing at the entertainment apparatus main unit 1 side will first be described. With the optical disk used here, the disk ID is recorded in an area which is not normally the object of recording data. Information for distinguishing the position where the disk ID is recorded (e.g., an address) is recorded in the normal data area. An example of material used for writing the disk ID to the optical disk 2 is an organic coloring matter used with write-once optical disks. The entertainment apparatus main unit 1 reads the disk information, finds the address where the disk ID is recorded, reads the disk ID following this address, and transmits the disk ID to the authentication server 4. This will now be described in detail.

In step 5102, the entertainment apparatus main unit reads in the basic data of the TOC (Table of Contents) from the loaded CD-ROM, under the control of the CPU. In step 5103, the volume identifier VD (Volume Description) for the data area of the CD-ROM is read in, and the entertainment apparatus main unit 1 searches for an address describing the disk ID.

In step 5104, a judgment is made regarding whether or not the address of the disk ID exists in the volume identifier VD. In the event that the ID address does not exist, a judgment is made that the loaded CD-ROM is not subject to protection by the disk ID verification system, the flow proceeds to step 5113, and the program is executed. The entertainment apparatus main unit 1 also functions as a music CD player, a movie DVD player, etc., and is not restricted to functioning as a gaming device. Accordingly, optical disks not subject to protection by the disk ID verification system (e.g., DVD-video disks, audio CDs, conventional game CDs) may be loaded on the entertainment apparatus main unit 1, and in such cases, the music or pictures are played, the game is executed, and so forth, in a straightforward manner.

In the event that the ID address exists in the volume identifier VD, in step S105, the pick-up of the optical disk drive unit 30 is slid toward the disk ID data portion of the CD-ROM (the portion provided on the inner side of the read-in area or on the outer side of the read-out area), following the ID address, in order to read the disk ID. Control of the sliding of the pick-up is performed by a mechanical control unit 23, based on a slide control output from the CPU 16.

In step S106, the CPU 16 judges whether or not disk ID information actually exists at the disk ID data portion on the CD-ROM. In the event that disk ID information does not exist or in the event that the disk ID information cannot be read, a judgment of no disk ID is passed, and the flow proceeds to step 5107. In step S107, execution of the program is rejected, and is force-quit.

In the event that disk ID information actually exists at the disk ID data portion, in step S108 the entertainment apparatus main unit 1 reads the disk ID information under the control of the CPU, and stores this in the main memory 17.

In step S109, the CPU 16 of the entertainment apparatus main unit 1 transmits the disk ID data to the authentication server 4, via various types of communication interfaces in accordance with standards such as USB, IEEE (Institute of Electrical and Electronic Engineers) 1394, PCMCIA (Personal Computer Memory Card International Association Architecture), or the like. Then, in step S110, the flow waits for the authentication server to perform verification processing for the transmitted disk ID.

In step 5111, the entertainment apparatus main unit 1 receives the results of the verification processing at the authentication server. In the event that the results of the verification processing at the authentication server are "Verified", a CD-ROM read-permitted command is received. In the event that the results of the verification processing at the host server are "Not verified", the flow proceeds to step S112, and execution of the program is rejected and is force-quit.

In the event that the results of the verification processing at the authentication server are "Verified", in step 5113 the CPU of the entertainment apparatus main unit 1 executes the program stored in the CD-ROM.

FIG. 4 illustrates the processing at the authentication server 4 side in the first disk ID verification system according to the present embodiment. The basic processing at the authentication server 4 will first be described. A user who has purchased an entertainment apparatus main unit 1 registers a user ID, such as his/her own name, and a device ID appropriated to each apparatus main unit 1, with the user database 5 of the authentication server 4 immediately after making the purchase. Also, a user who has purchased a new game program must transmit the disk ID information at the time of the first use thereof to the user database 5 of the authentication server 4, or the program cannot be executed (see step S109). Accordingly, at least disk IDs are stored in the user database 5 of the authentication server 4 as user information. Further, any of user IDs, device IDs and the like, each associated therewith, may be stored in the user database 5. The user information is tabulated and is accumulated in the user database 5.

Figure 7:
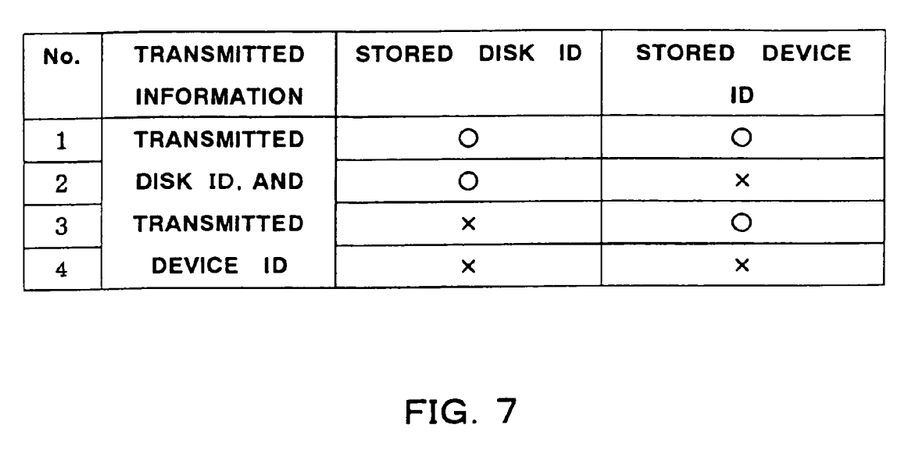
FIG. 7 is a table illustrating the results of a comparison between a disk ID and device ID received by an authentication server, and user information accumulated in a user database beforehand.

In the event of a user starting a game under such conditions, disk ID and device ID information of the disk and device used by the user is transmitted from the entertainment apparatus main unit 1 to the authentication server 4, and the authentication server 4 compares the received disk ID and device ID with user information stored in the user database. There are four possible results of this comparison, as shown in FIG. 7.

No. 1: Both the disk ID and the device ID match that stored in the user database 5.
No. 2: Only the disk ID matches.
No. 3: Only the device ID matches.
No. 4: Neither the disk ID nor the device ID match.

In the event that No. 1 is true, i.e., in the event that the combination of the disk ID and the device ID that has been transmitted matches the disk ID and the device ID already registered in the user database 5, a judgment is passed that the disk 2 is a valid disk. However, there is the possibility that, in rare cases, the device ID may be copied in an unauthorized manner, and also the disk ID may be copied in an unauthorized manner. In order to eliminate such cases, in the event that verification requests for the same disk ID and device ID combination occur in the same time period, it is judged to be unauthorized use, so the number of times of unauthorized use is counted and recorded in the user database 5, and execution of the program is rejected.

In the event that No. 2 is true, i.e., in the event that of the combination of the disk ID and the device ID that have been transmitted, only the disk ID matches the disk ID registered in the user database, the following three possibilities exist.

The owner of the disk 2 lent the disk 2 to another individual.
The owner of the disk 2 executed the disk 2 on another individual's apparatus.
An unauthorized copy.

Which of these three is true can be discerned by prompting the user of the device ID registered along with the disk ID for confirmation. This entertainment system is capable of such a confirmation task since each of the entertainment apparatus main units 1 are connected to the authentication server 4.

In the event that No. 3 or No. 4 is true, i.e., in the event that the combination of the disk ID and the device ID that have been transmitted the disk ID is unregistered, a judgment is made that this is the first time the disk 2 is being used, and the disk ID is registered in the user database 5. This will be described in detail.

In step S202, the authentication server 4 performs connection verification with regard to the entertainment apparatus main unit 1 which the user uses. In the event that the device ID of the apparatus main unit 1 is automatically supplied to the server 4 as part of the transmission data from the apparatus main unit 1, all that is necessary for the user is to enter the password, which is the user ID. In the event that connection verification fails, in step S203, the connection between the user terminal device and the authentication server 4 is cut off. In the event that the connection verification is successful, the communication connection between the apparatus main unit 1 of the user and the server 4 is established in step S204.

In step S205, the authentication server 4 receives the disk ID data and device ID from the entertainment apparatus main unit 1. This is processing corresponding to step S109 in FIG. 3.

In step S206, the authentication server 4 compares the received disk ID and device ID with the user information (disk ID and device ID) recorded in the user database 5.

In step S207, a judgment is made regarding whether or not the received disk ID matches the disk ID registered in the database 5. That is to say, in the event that the received disk ID is not in the table in the user database 5, the disk 2 is being used for the first time. In this case, the flow proceeds to step S208, where the authentication server 4 performs registration of the disk ID to the database 5. Then, in step S212, a program execution permission command is transmitted to the entertainment apparatus main unit 1.

In the event that the transmitted disk ID has already been registered in the database 5, the flow proceeds to step S209, and a judgment is made regarding whether or not the received device ID and the device ID of the device registered for using the disk 2 with the disk ID match. In the event that the device IDs do not match, the flow proceeds to step S210, and confirmation for usage permission is made with the user of the device ID corresponding to the disk ID (i.e., the owner of the disk). In step S211, in the event that the disk owner grants permission (i.e., in the event that the disk owner returns a transmission to the server 4 to the effect of permitting use of the disk), this means that the disk owner has lent his/her own disk 2 to another individual, or is executing the disk 2 using another entertainment apparatus main unit 1, and in step S212, a program execution permission command is transmitted to the entertainment apparatus main unit 1.

In the event that the disk owner does not consent, it is judged as a case of unauthorized use, the number of times of unauthorized use is counted in step 5214, and a program execution rejection command is transmitted to the entertainment apparatus main unit 1 in step S215. Thus, unauthorized use of secondhand articles and the like can be eliminated.

Even in the event that the combination of the disk ID and the device ID match the user information registered in the user database 5, the rare cases wherein both IDs have been copied in an unauthorized manner must be eliminated. In step S213, a judgment is made regarding whether or not use of the same disk ID and device ID combination is occurring in the same time period. In the event that simultaneous use is not occurring, a program execution permission command is transmitted to the entertainment apparatus main unit 1 in step S212. In the event that simultaneous use is occurring, it is judged to be unauthorized use, the number of times of unauthorized usage is counted in step 5212, and a program execution rejection command is transmitted to the entertainment apparatus main unit 1 in step S215.

Normally, unauthorized disks 2 are complete copies of the contents of genuine disks 2, so the address data of the disk ID registered in the data area is also copied. However, with the format according to the present embodiment, the ID information is recorded at a location other than the data area such as on the inner side of the read-in area or on the outer side of the read-out area or so forth, so that the ID is not copied onto an unauthorized disk 2 even if a genuine disk 2 is copied onto the unauthorized as it is. Thus, the disk ID itself does not exist on the unauthorized disk 2 even though information relating to the address of the disk ID has been copied, so that execution of programs on unauthorized disks 2 in step 5107 can be eliminated by judging in step S104 in FIG. 3 that the address of the disk ID does exist, and then judging in step 5106 that the disk ID itself does not exist.

The method for recording the disk ID is not restricted to the above-described. For example, the disk ID may be formed with a method using physical changes in pit rows within the data area. The method using physical changes in pit rows may use one of a change in radial direction of pit rows (wobbling), a change in the minor axis direction of pit size, and a change in the depth direction of pits. Or the disk ID may be formed with a method using electronic watermarking (digital watermarking).

The method for registering the disk ID to the authentication server is not restricted to the above-described methods. Also, there are special cases wherein a disk supplier may itself provide an authentication server 4, for example, as only one manufacturer. In such a case, the disk IDs of the disks 2 which the provider manufactures and provides can be registered and stored in the database 5 of the host server 4 beforehand. In such cases, the process for registering the disk ID at the initial time of use is not necessary with the first disk ID verification system.

Also, a device ID is not necessarily needed. The device ID can be replaced with user IDs unique to each user. That is, instead of distinguishing the device used, the user is distinguished, and the verification system can be made to function with the combination of user ID and disk ID. In this case, the user ID is preferably appropriated in the form of a password.

Described below are cases wherein a disk supplier itself provides an authentication server 4.

Upon manufacturing disks 2, the disk supplier gives one individual manufacture serial number to each disk 2 and installs the number as disk ID information in each disk 2. Concurrently, the disk ID (manufacture number) is recorded in the user database 5. On the other hand, one individual manufacture serial number is given to each entertainment apparatus 1 and the number is installed as an apparatus ID in each apparatus 1. Concurrently, the apparatus ID (manufacture number) is recorded in the user database 5.

In this case, when a disk 2 is shipped from the factory, the disk ID has not been related to the apparatus ID of the entertainment apparatus 1.

A user of the disk 2 makes a request for connection and verification processing to the authentication server 4 (S109), and then the authentication server 4 verifies the apparatus ID followed by verifying the disk ID.

Since the apparatus ID and the disk ID (user information) is pre-recorded in the user database 5, the authentication server 4 checks whether the apparatus ID—disk ID received from the entertainment apparatus 1 corresponds to the user information stored in the database 5.

If the result indicates that nothing corresponds to the user information of the database 5, the verification processing is forcedly terminated and execution of the program stored in the disk 2 is rejected. Under these circumstances, accumulation of unauthorized ID's in the database 5 could facilitate the management of unauthorized disks 2, such as a count of the number of times that the authentication server 4 has been accessed by unauthorized disks 2, identification of the entertainment apparatus 1 utilizing unauthorized disks, and so on.

In addition to the rejection of unauthorized disks 2, the network system of the present invention may advantageously utilize a count of the number of times accessed by use of a disk 2 with a given disk ID. More particularly, the system utilizes the number of times access to the authentication server 4 has been made such that when the access number exceeds a predetermined value, the verification processing is forcedly terminated and execution of the program stored in the disk 2 is rejected.

For example, by managing the number of times accessed by use of a disk 2 with a given disk ID, it is possible to provide a trial period during which a user is allowed to utilize content, such as the program stored in the disk 2. As the result, a user can enjoy games, services and so on using the content, such as programs stored in the disk 2, for the trial period, i.e. until the disk 2 is utilized a predetermined number of times.

Currently, in many types of trial versions of Internet connection services software, a trial period is set so as to count a time interval of utilization. According to the network system of the present invention, however, service management based on the number of times of utilization can be made rather than management based on the time interval of utilization.

For example, there is offered a service enabling the download of music or pictures from a content server 6 to an entertainment apparatus 1 through the authentication server 4. In this case, the disks 2 for utilizing the service are distributed from the service provider to users subscribing to the service. Each of the disks 2 is stored with a disk ID given to that disk 2 as well as a verification program, a download execution program, and so on. By loading the disk 2 into the entertainment apparatus 1, the user is allowed to connect to the authentication server 4 and the content server 6, to execute downloading of music, pictures and so on.

On this occasion, if the authentication server 4 counts the number of times that a download is executed as the number of times access is made by use of the disk 2 with the given disk ID, limitation of access to the service can be realized depending on the number of times rather than the time interval of downloading (communication).

Additionally, if items of content accessed by each of the users is related to user information (apparatus ID, user ID, disk ID and so on) in the authentication server 4 and then the resulting interrelation information is accumulated in the database 5, then management of each user regarding user preferences and so on may be facilitated. By utilizing such accumulated information, the service provider or content provider can provide appropriate advertisements and so on to respective individual users through a communication network such as the Internet.

The above mentioned method for limiting utilization of service provision is based on the number of times that the service is utilized, but the present invention is not limited to this method. For example, the service provider may provide content stored in the disk 2 with the given disk ID, with limitation depending on a sum of money collected from the user. Now, it is assumed that content stored in the disk 2 are not wholly available, but partly. When the user wants to utilize the partly unavailable content, the user has to pay the provider the money depending on the content to be utilized. Upon receipt of payment, the service provider permits utilization by the user.

For example, if content stored in a disk 2 is partly encrypted, a user that has not paid fee for utilization is not permitted to utilize the encrypted portion, whereas a user that paid the fee is permitted to utilize it with a key for decryption which is provided to the entertainment apparatus 1 from the service provider. Information sent from the service provider to the entertainment apparatus 1 is not limited to the decryption key.

In order to utilize the partly unavailable content stored in the disk 2, the user must not only pay the fee for utilization to the service provider, but also, for example, the user may need to send the user ID to the authentication server 4 which is operated by the service provider. The user ID may be an ID given in advance to the user by the service provider.

Next, the second disk ID verification system will be described. With the second disk ID verification system, the disk 2 to be verified is not restricted to CD-ROMs, and includes DVD-ROMs and so forth without TOCs stipulated. Also, the place for recording the disk ID within the disk 2 is not restricted, and may be anywhere on the inner side of the read-in area, on the outer side of the read-out area, or in the data area.

In comparison with the above-described first disk verification system, where connection for verification was made with the server 4 each time a program on the disk 2 is activated for playing a game, in the second disk verification system, the processing step of connecting to the server 4 can be omitted by storing the user information in an external storage device which is connected to the main unit 1, such as a memory card 11 or the like. That is to say, at the first time of using the disk 2, the user information of the disk ID and device ID are recorded in the memory card 11 or the like at the first time of using the disk 2, and each time the user plays a game this user information is used to verify the disk 2. Note that content, such as application programs, may be stored in the external storage device, as well.

Figure 5:
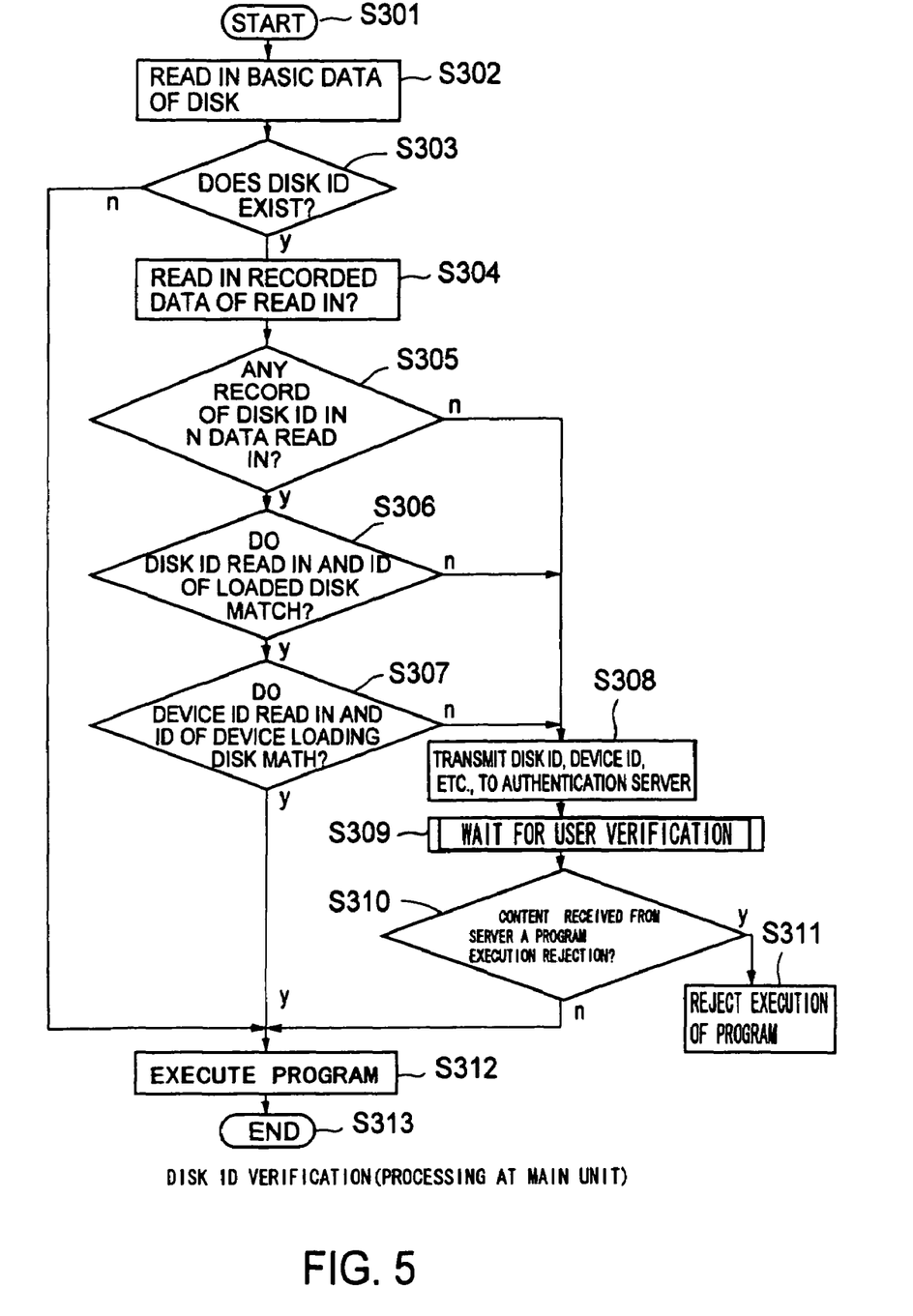
FIG. 5 is a flowchart of the processing at the apparatus main unit side in a second disk ID verification method.

The processing at the entertainment apparatus main unit 1 side according to the second disk ID verification system will be described in detail with reference to FIG. 5, and the processing at each of the steps at the authentication server 4 side will be described in detail with reference to FIG. 6.

In step 5302, under control of the CPU 16, the entertainment apparatus main unit 1 reads the basic unique data recorded in the loaded disk 2 into the main memory 17. The loaded disk 2 may be a CD, CD-ROM, DVD-video, DVD-ROM, or other types of disks.

In step 5303, a judgment is made regarding whether or not a disk ID exists within the basic data that has been read in. In the event that a disk ID does not exist, the disk 2 is judged to be a disk that is not the object of verification, so the flow proceeds to step 5312, and the program is executed.

In the event that a disk ID exists, the flow proceeds to step S304, and under the control of the CPU 16, user information (data of the combination of the disk ID and device ID) recorded in the external storage device, such as the memory card 11 or the like, connected to the entertainment apparatus main unit 1 is read in. Note that this memory card 11 or the like also records game high-scores, back-up data of the progress of games ended partway through, and so forth.

In step S305, a judgment is made regarding whether or not the disk ID is recorded in the memory card 11. The disk ID and device ID are registered in the user information of the memory card 11 at the time of using the disk 2 for the first time, so for second and subsequent uses, the disk ID will be registered in the memory card 11 as user information. Accordingly, cases wherein the disk ID is not recorded in the memory card 11 will included cases of (1) using the disk 2 for the first time, (2) exchanging the memory card 11 itself, and so forth. In the event that the read disk ID is recorded in the memory card 11 or the like, the flow proceeds to step S306.

In step S306, a judgment is made regarding whether or not the disk ID recorded in the memory card 11 or the like matches the disk ID of the loaded disk 2. In the event that these do not match, it may be that the disk 2 is being used for the first time, or other cases may be considered. In the event that these match, the flow proceeds to step S307.

In step S307, a judgment is made regarding whether or not the device ID read in from the memory card 11 matches the device ID of the apparatus main unit 1 currently being used. In the event that these do not match, cases that may be conceived include a case wherein a user has borrowed a disk 2 and memory card 11 from the owner thereof and is playing a game on his/her own apparatus. In the event that these match (i.e., in the event that the combination of the disk ID and device ID match the user information recorded in the memory card 11 or the like at the time of purchasing the disk 2), it is determined that this qualifies as valid usage, the user verification is completed, and the program is executed in step S312.

In the event that the disk ID does not exist in the memory card 11 in step S305, in the event that the disk ID recorded in the memory card 11 or the like does not match the disk ID read in from the disk 2 in step S306, or in step S307, in the event that the device ID recorded in the memory card 11 or the like does not match the device ID of the device being used, the flow proceeds to the step S308. In step S308, the entertainment apparatus main unit 1 transmits the disk ID, and the device ID data of the device being used to the authentication server 4 via a communication interface according to standards such as USB, IEEE 1394, PCMCIA, etc., and waits for user verification in step S309. Subsequently, in the event that a command is received from the authentication server 4 to record the disk ID and device ID data in the memory card 11, the IDs are written thereto (corresponding to step S405 in FIG. 6).

In step S310, whether or not to execute the program is determined based on the results of the verification processing at the authentication server 4. In the event that the results are "Not verified", the flow proceeds to step S311, and execution of the program is rejected and is force-quit. In the event that the results are "Verified", the flow proceeds to step S312, and executes the program.

Figure 6:
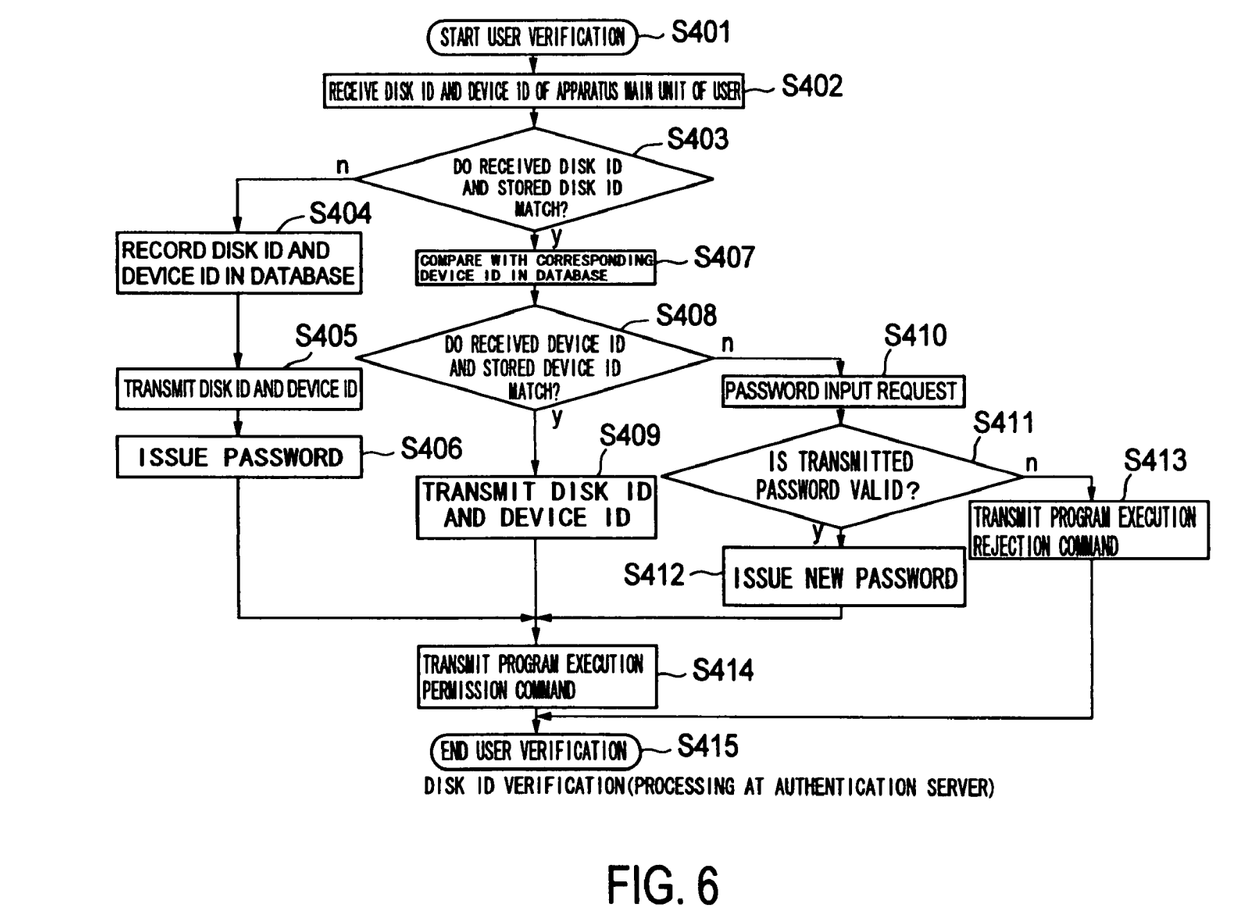
FIG. 6 is a flowchart of the processing at the authentication server side in a second disk ID verification method.

FIG. 6 illustrates the processing at the authentication server 4 side according to the second disk ID verification system.

In step S402, following the establishment of a connection with the entertainment apparatus main unit 1, the host server 4 receives the disk ID and the device ID of the apparatus main unit 1. The disk ID is that read from the disk 2 in step S302 in FIG. 5 and transmitted in step S308, and the device ID is also that transmitted in step S308.

In step S403, a judgment is made regarding whether or not the received disk ID exists within the disk IDs accumulated in the user database 5 of the authentication server 4. In the event that this does not exist, the disk 2 is judged as being used for the first time. Accordingly, the combination of the received disk ID and device ID are tabulated and accumulated (registered) in the user database 5 as user information in step S404. Next, in step S405, the verification processing described with reference to FIG. 5 can be realized by recording the disk ID and device ID in a mutually-correlated manner in the memory card 11 or the like connected to the apparatus main unit 1 of the user.

In step S406, the authentication server 4 transmits a password for the disk 2 being used to the apparatus main unit 1. This password is a secret key which only the owner of the disk 2 can know, and as described later, is used for confirming intent of the user. This password is preferably output on the screen of the apparatus main unit 1 which the user uses. The user can write down the password and inform others of the password when lending others the disk 2, so that others can use the disk 2 as well. Subsequently, in step S414, a program execution permission command is transmitted to the entertainment apparatus main unit 1.

In step S403, in the event that the received disk ID matches the registered disk ID, the received device ID is compared with the device ID in the database 5 corresponding to the disk ID in step S407 to see of these match, and in step S408, a judgment is made regarding whether or not the two match. Data, made up of the combination of the disk ID and device ID, is accumulated in the user database 5 for all disks 2 that have been used even once, so in step S408, a judgment is passed regarding whether or not the device ID corresponds to the disk ID. Thus, use of secondhand articles can be eliminated. In the event of replacing the memory card 11 or in the event that the data of the disk ID and device ID recorded in the memory card 11 is deleted, in step S409, the authentication server 4 transmits data of the combination of the disk ID and device ID to the entertainment apparatus main unit 1 for recording in the memory card 11. Subsequently, in step S414, a program execution permission command is transmitted to the entertainment apparatus main unit 1.

In the event that the disk ID exists in the user database 5 but the corresponding device ID does not match that in the database 5, the flow proceeds from step S408 to step S410, and a password input request is transmitted to the entertainment apparatus main unit 1. This input request is displayed on a monitor (not shown) connected to the apparatus main unit 1. In step S411, a judgment is made regarding whether or not the password received from the user is valid. In the event that this is valid, the flow proceeds to step S412, and a new password is issued and transmitted for the borrower or the like of the disk 2. Program execution rejection commands can be avoided by the disk borrower or the like inputting this password when borrowing the disk 2 from the disk owner under agreement. This means that the disk borrower does not necessarily have to also borrow the memory card 11 from the disk owner along with the disk 2. Also, in step S412, the password unique to the disk 2 issued to the disk owner is updated. The updated password is transmitted to the disk owner. Thus, widespread circulation of secondhand articles can be avoided.

Following step S412, in step S414 the authentication server 4 transmits a program execution permission command to the entertainment apparatus main unit 1.

In the event that a judgment is made in step S411 that the password received from the user is not valid, the flow proceeds to step S413, and authentication server 4 transmits a program execution rejection command to the entertainment apparatus main unit 1.

In the above-mentioned embodiments of the first disk ID verification system and the second disk ID verification system, the user may make his own entertainment apparatus 1 read a program out of a recording medium such as an optical disk 2 at hand. However, the present invention is not limited to this way. For example, in event that a recording medium given with a disk ID is remotely located, after authentication thereof is done by remotely controlling to execute the first or second disk ID verification system, a program stored in the recording medium may be downloaded. Alternatively, in event that a recording medium given with a disk ID is remotely located, after a program stored in the recording medium is be downloaded, authentication thereof may be done by executing the first or second disk ID verification system, and then the program may be executed.

Thus, according to the present invention, a computer system, having a verification system for verifying whether or not recording mediums such as optical disks are being used in an unauthorized manner, can be provided.

Further, according to the present invention, a method for using a computer system having a verification system for verifying whether or not recording media, such as optical disks, are being used in an unauthorized manner can be provided.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A network system, comprising:
   a first information processing apparatus having a user interface for receiving input including a password from a user and for providing output to the user; and
   a second information processing apparatus including a database, said second information processing apparatus capable of being connected to the first information processing apparatus via a network,
   wherein the second information processing apparatus is operable to receive first identification information, and second identification information and the password over the network from the first information processing apparatus, the first identification information identifying at least one of the first information processing apparatus or a user of the first information processing apparatus, the second identification information identifying a program stored on a recording medium coupled to the first information processing apparatus, the second information processing apparatus being operable to verify whether the received first and second identification information and the password match data stored in the database, such that when the first identification information does not match the data stored in the database, and when the second identification information matches the data stored in the database and a password inputted by the user at the first information processing apparatus is valid, the second information processing apparatus permits the first information processing apparatus to execute the program.

2. A network system as claimed in claim 1, wherein the first identification information includes a user ID identifying the user.

3. A network system as claimed in claim 1, wherein the first identification information includes a device ID identifying the first information processing apparatus.

4. A network system as claimed in claim 3, wherein the device ID is unique to the first information processing apparatus.

5. A method of remotely authorizing execution of a program stored on a recording medium, comprising:
   receiving first identification information and second identification information at a second information processing apparatus from a first information processing apparatus via a network, the first identification information identifying at least one of the first information processing apparatus or a user of the first information processing apparatus, the second identification information identifying a program stored on a recording medium coupled to the first information processing apparatus;
   determining (a) whether the first and second identification information match data stored in a database at the second information processing apparatus, and (b) whether the second identification information matches data stored in the database and a password inputted by the user at the first information processing apparatus is valid, when the first identification information is determined not to match the data stored in the database; and
   when the first identification information is determined not to match the data stored in the database, and the second identification information is determined to match the data stored in the database and the password inputted by the user at the first information processing apparatus is valid, permitting the first information processing apparatus to execute the program.

6. A method as claimed in claim 5, wherein the first identification information includes a user ID identifying the user.

7. A method as claimed in claim 5, wherein the first identification information includes a device ID identifying the first information processing apparatus.

8. A method as claimed in claim 7, wherein the device ID is unique to the first information processing apparatus.

9. A computer-readable storage medium having instructions stored thereon, the instructions being executable by a computer to perform a method of remotely permitting execution of a program stored on a recording medium, the method comprising:
   receiving first identification information and second identification information at a second information processing apparatus from a first information processing apparatus via a network, the first identification information identifying at least one of the first information processing apparatus or a user of the first information processing apparatus, the second identification information identifying a program stored on a recording medium coupled to the first information processing apparatus;
   determining (a) whether the first and second identification information match data stored in a database at the second information processing apparatus, and (b) whether the second identification information matches data stored in the database and a password inputted by the user at the first information processing apparatus is valid, when the first identification information is determined not to match the data stored in the database; and
   when the first identification information is determined not match the data stored in the database, and the second identification information is determined to match the data stored in the database and the password inputted by the user at the first information processing apparatus is valid, permitting the first information processing apparatus to execute the program.

10. A second information processing apparatus capable of being connected through a network to a first information processing apparatus, the second information processing apparatus comprising a database and being operable to receive a password inputted by a user at the first information processing apparatus and first identification information and second identification information over the network from the first information processing apparatus, the first identification information identifying at least one of the first information processing apparatus or a user of the first information processing apparatus, the second identification information identifying a program stored on a recording medium coupled to the first information processing apparatus, and verify whether the received first and second identification information and the password match data stored in the database,
   such that when the first identification information does not match the data stored in the database, and when each of the second identification information and the password matches the data stored in the database, the second information processing apparatus permits the first information processing apparatus to execute the program.

11. A network system as claimed in claim 1, wherein when each of the first and second identification information matches the data stored in the database, the second information processing apparatus permits the first information processing apparatus to execute the program.

12. A method as claimed in claim 5 further comprising:
   when each of the first and second identification information is determined to match the data stored in the database, permitting the first information processing apparatus to execute the program.

13. A computer-readable storage medium as claimed in claim 9, wherein the method further comprises:
   when each of the first and second identification information is determined to match the data stored in the database, permitting the first information processing apparatus to execute the program.

14. A second information processing apparatus as claimed in claim 10, wherein when each of the first and second identification information matches the data stored in the database, the second information processing apparatus permits the first information processing apparatus to execute the program.

* * * * *